United States Patent [19]

Day et al.

[11] Patent Number: 4,640,485
[45] Date of Patent: Feb. 3, 1987

[54] ADJUSTABLE SUPPORT FOR DISPLAY MONITOR

[75] Inventors: George D. Day, Winchester; John K. Flack, Chandlers Ford; Ian Golledge, Romsey; Christopher J. Hillary, Chandlers Ford; John V. Pike; Michael H. Watson, both of Winchester, all of United Kingdom

[73] Assignee: International Business Machines Corporation, Armonk, N.Y.

[21] Appl. No.: 742,260

[22] Filed: Jun. 7, 1985

[30] Foreign Application Priority Data

Jun. 8, 1984 [EP] European Pat. Off. .......... 084303888

[51] Int. Cl.⁴ ............................................. F16M 13/00
[52] U.S. Cl. ........................................ 248/422; 248/1; 248/183; 248/279; 248/280.1; 248/297.1
[58] Field of Search ............... 248/183, 422, 157, 278, 248/279, 280.1, 297.1, 669, 660, 661, 662, 346, 349, 1 A–1 J

[56] References Cited

U.S. PATENT DOCUMENTS

| | | | |
|---|---|---|---|
| 1,065,280 | 6/1913 | Stanger et al. | 248/422 |
| 1,196,084 | 8/1916 | Cogger | 248/422 |
| 3,970,792 | 7/1976 | Benham et al. | 248/183 |
| 3,993,278 | 11/1976 | Race | 248/551 |
| 4,395,010 | 7/1983 | Hedgeland | 248/1 E |
| 4,410,159 | 10/1983 | McVicker et al. | 248/349 |
| 4,483,503 | 11/1984 | Gaham | 248/349 |
| 4,533,105 | 8/1985 | Cornwell, Jr. et al. | 248/183 X |

FOREIGN PATENT DOCUMENTS

| | | |
|---|---|---|
| 0070336 | 1/1983 | European Pat. Off. . |
| 3036852 | 5/1982 | Fed. Rep. of Germany . |
| WO85/01648 | 4/1985 | PCT Int'l Appl. ......... 248/1 E |

*Primary Examiner*—J. Franklin Foss
*Assistant Examiner*—David L. Talbott
*Attorney, Agent, or Firm*—Frederick D. Poag

[57] ABSTRACT

An adjustable support for a display monitor includes a turntable to allow swivelling and carrying a pair of support tubes on which is mounted a slidable support beam. A carrier having cylindrical bearing surfaces co-operates with skid-pads on the support beam. By sliding the carrier with respect to the support beam the angle of the carrier and hence the angle of the display screen can be varied. A non-magnetic gas strut located in one of the support tubes compensates for the weight of the monitor/carrier assembly. The force exerted by the gas strut is shared between the support tubes by means of a pair of coupled rack and pinions which also allow convenient height adjustment of the support beam, carrier and display monitor.

8 Claims, 9 Drawing Figures

ADJUSTABLE SUPPORT FOR DISPLAY MONITOR

FIELD OF THE INVENTION

This invention relates to an adjustable support for a display monitor, and more particular a support which allows the display monitor to be tilted, swivelled and adjusted for height.

PRIOR ART

In recent years, in an effort to improve their ergonomics, display monitors in display terminals for data entry, data processing or word processing have been mounted on adjustable supports. Most of these adjustable supports, exemplified by the mechanisms described in European Patent Specifications 16,913A, 41,804A, 70,336A and 70,337A, and U.S. Pat. Specifications 3,970,792, 4,365,779, 4,395,010, 4,410,159 and 4,415,136 allow swivelling and tilting only, normally by using two matching spherical surfaces.

Some supports also allow height adjustment, as exemplified by U.S. Pat. Specification 4,304,385 and European Patent Specifications 46,225A and German Patent Specification 3036852A. The latter uses a gas strut (or gas spring) to counter-balance the weight of the display monitor: other mechanisms employ counter-balancing springs. A typical monitor can weigh 15 to 20 Kg.

Although gas struts have been widely used in mechanisms for adjusting the heights of chairs and to counter-balance the weights of automobile tailgates, they have not been widely used in display monitor supports despite their attractions of low cost, compactness and reliability. The Tektronix ADS 01 adjustable display support for the Tektronix 4105 display uses a gas strut to compensate for the weight of the display which is carried on a swinging cradle supported by a pair of telescopic columns. The gas strut is located horizontally in the base of the assembly and is linked to the cradle supports by a system of cables, pulleys and levers.

We have found that to use a gas strut successfully in a support mechanism for a display monitor, certain measures need to be taken.

Firstly, to prevent the display monitor from assuming a too high position even in its lowermost position, the gas strut must not be positioned in an upright position directly beneath the monitor. If upright, it must be to the side of the display monitor rather than directly beneath it so that the gas strut itself does not add to the overall height. Provision must then be made for the fact that the center of gravity of the monitor will no longer be positoned directly over the gas strut. Where the display monitor incorporates a cathode ray tube, care must be taken to ensure that the support structure including the gas strut does not magnetically adversely influence the cathode ray tue since otherwise there will be a degradation of the displayed image.

SUMMARY OF INVENTION

According to the present invention, an adjustable support for a display monitor comprises an adjustable support for a display monitor comprising a turntable, a pair of vertically-exending support columns at least one of which is hollow to contain a gas strut of non-magnetic material, a slidable support beam supported on and slidable alongside support columns thereby to vary the height of the support beam relative to the turntable, a support carrier mounted on said support beam in such a manner that the angle between the carrier and the beam can be varied, and means for securing a display monitor to the support carrier, the gas strut being secured by one end of the turntable and its other end to the support beam to counterbalance the weight of a display monitor secured on the carrier thereby to assist in the raising and lowering of the support beam along the support columns.

BRIEF DESCRIPTION OF DRAWINGS

The invention will now be particularly described, by way of example, with reference to the accompanying drawings, in which.

DESCRIPTION OF PREFERRED EMBODIMENT

Figure 1:
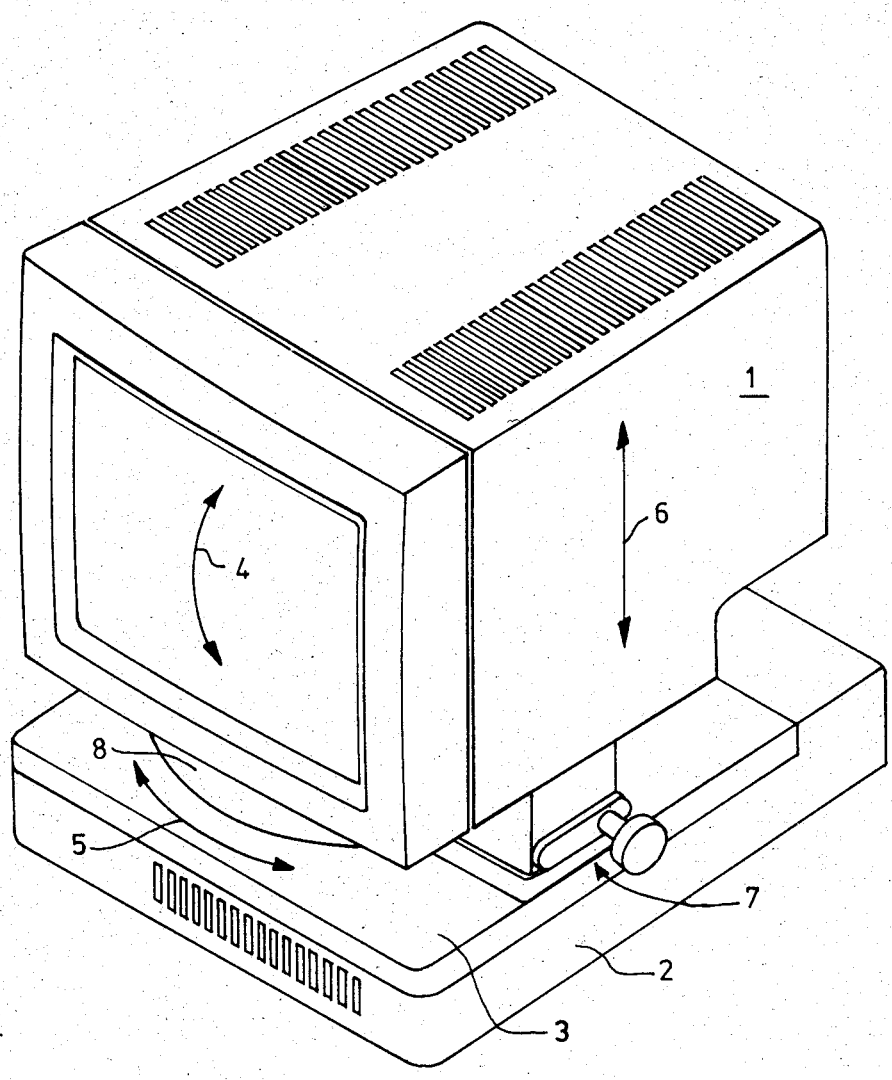
FIG. 1 shows a display monitor mounted on a plinth and logic unit.

Referring now to FIG. 1, a display terminal includes a display monitor (1) mounted on a logic unit (2) by means of an adjustable support (3). The support allows the display monitor to be tilted as represented by arrow (4) to allow the vertical angle of the screen of the display to be adjusted to the optimum viewing angle and swivelled as represented by arrows (5) to allow selection of the azimuth. The monitor (1) can also be adjusted for height, as represented by arrows (6), by means of a height control (7). Just visible in FIG. 1 is part of a turntable (8) which allows sivelling of the monitor with respect to the logic unit (2).

Figure 2:
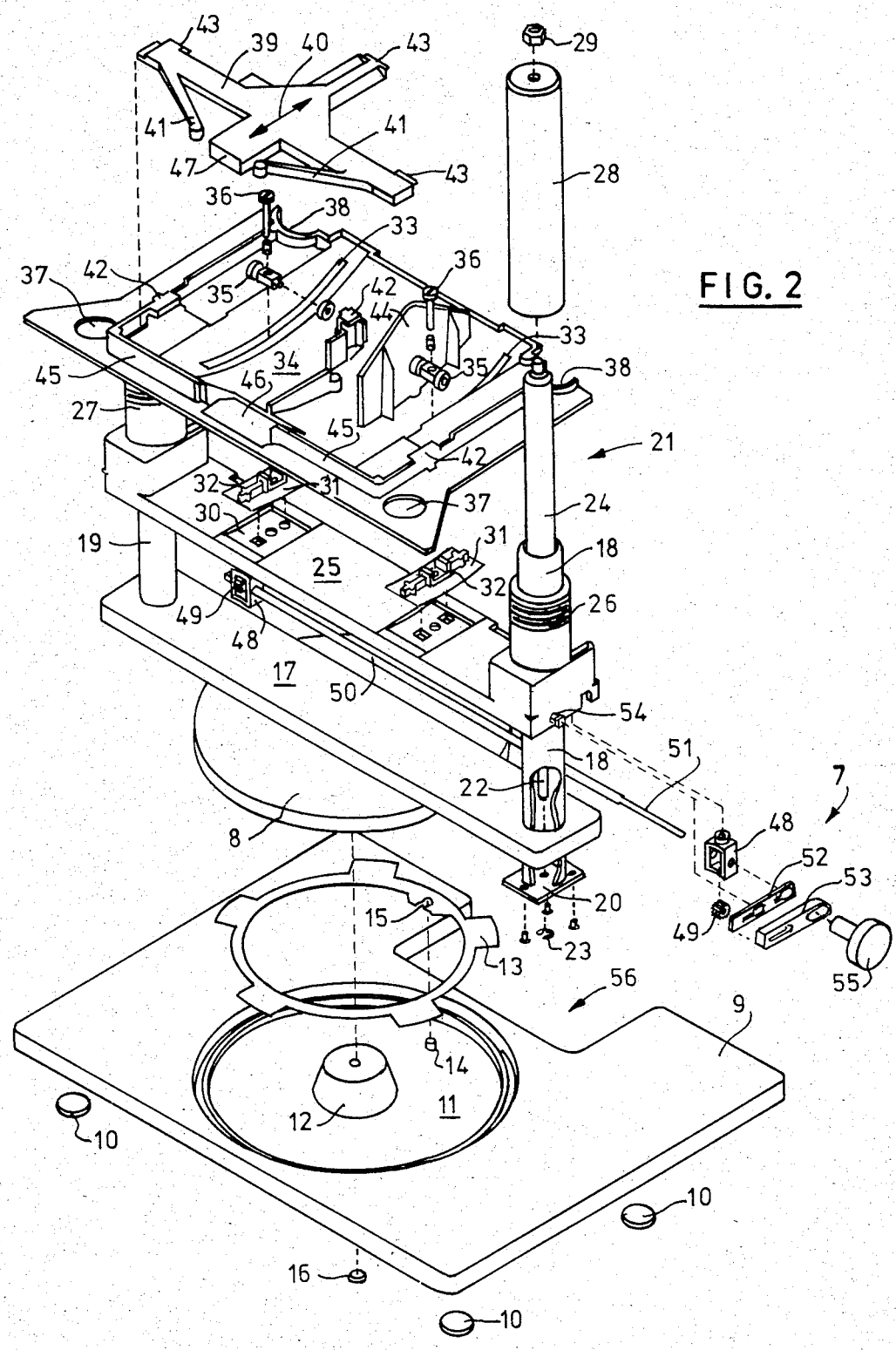
FIG. 2 is an exploded diagram of an adjustable support for the monitor.

FIG. 2 is an exploded view of the support (3) which includes a plinth (9), preferably of die cast aluminium although plastics material could also be used, carrying feet (10) of cork, rubber or soft plastics material. A recess (11) containing a central boss (12) receives a friction ring (13) of nylon, acetal, PTFE or other low friction material. An integral peg (14) located within a slot (15) in the friction ring (13) prevents rotation of the latter. The peg (14) is also located in an arcuate groove (not shown) in the bottom surface of turntable (8) to limit the rotation of the latter. The turntable (8) is secured within the recess (11) by means of a spindle, not shown, passing through the central boss (12), and a nut (16), the tightness of which controls the force required to rotate the turntable (8).

The turntable (8), preferably of die-cast aluminium but alternatively of suitable plastics material has an integrally formed arm (17) which carries support tubes (18) and (19) secured by plates (20), welded to the support tubes and only one of which is shown. The support tubes (18) and (19) are made from non-magnetic stainless steel such as type 304. Located within the support tube (18) is a gas strut (21) having a non-magnetic brass cylinder (24) and a non-magnetic stainless steel piston rod (22) secured to the plate (20) by means of a circlip (23). A beam (25), preferably of die-cast aluminium is slidably mounted on the support tubes (18) and (19) by means of integral collars (26) and (27) respectively each of which contains a pair of bearings, not shown. The upper part of at least the collar (26) is threaded to receive a threaded retainer (28), preferably an impact extrusion of aluminium to which the gas strut (21) is secured by means of nut (29).

Recesses (30) in the beam (25) locate a pair of plastic skid pads (31), parts (32) of which protrude through slots (33) in a platform or carrier (34) preferably made from die-cast aluminium. The carrier (34), which has a cylindrical lower surface, is urged against the upper surfaces of the skid pads (31) by means of spring loaded rollers (35) secured to the beam (25) by bolts or screws (36). Holes (37) in the carrier (34) and recesses (38) receive the feet (not shown) of the display monitor (1) (FIG. 1) when it is placed on the carrier (34). The monitor is latched onto the carrier (34) by means of a slidable latch (39), preferably of plastics material, slidable in direction (40) against the action of integral spring fingers (41). The latch (39) is retained in the carrier (34) by means of integrally formed retainers (42). Camming surfaces (43) on the latch (39) operate the latch (39) as the display monitor is lowered onto the carrier (34), guide plate (44) serving to guide the monitor in association with a corresponding slot in the underside of the monitor. The latch (39) can be released against the spring pressure of fingers (41) acting on walls (45) by inserting a finger upwardly through aperture (46) to locate the release tab (47).

The support beam (25) also carries a pair of bearing blocks (48) carrying pinions (49) on a shaft (50), the end (51) of which is of a non-circular cross section to allow the shaft (50) to be locked against rotation by means of a slidable latch plate (52) having a latch cover (53). A guide block or post (54) serves to guide and retain the slotted locking plate (52). A control knob (55) is provided to assist rotation of the shaft (50) and pinions (49) which co-operate with racks on the rear of the support tubes (18) and (19).

The recess (56) in the plinth (9) is provided to allow for a cooling fan, not shown, provided at the rear of the logic unit (2).

Figure 3:
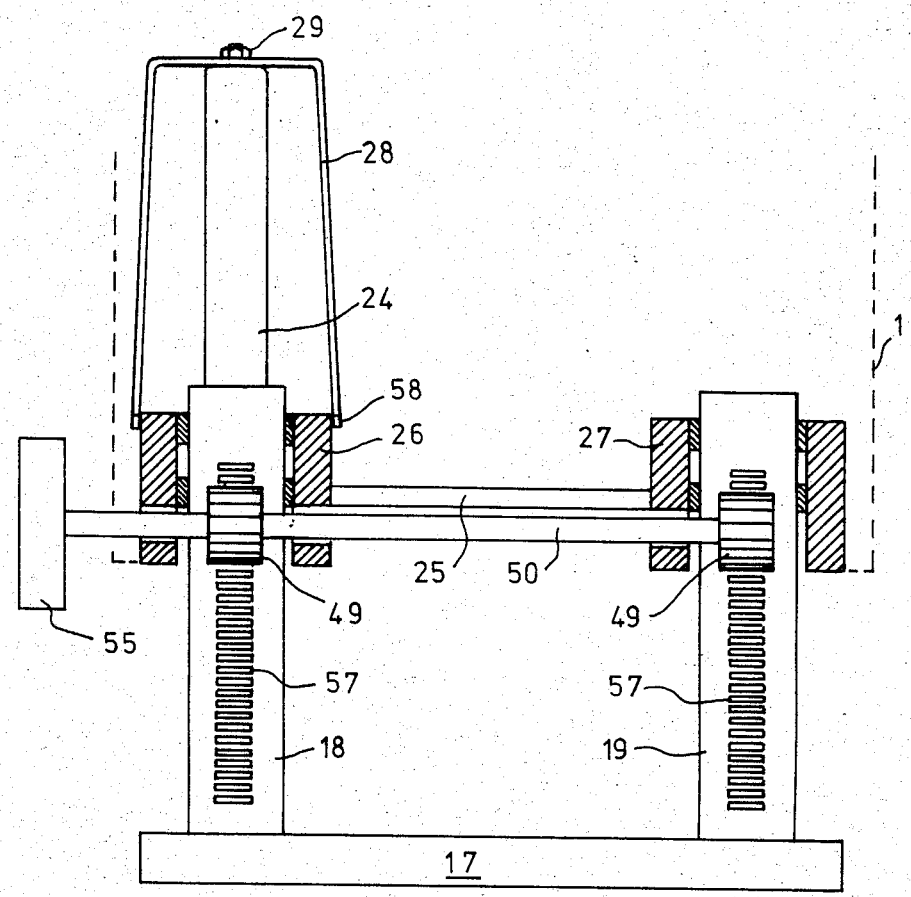
FIG. 3 shows diagrammatically how a pair of coupled rack and pinions are used to equalise the load on two support columns.

FIG. 3 is a part sectional view from the rear of the support assembly showing how racks (57) are provided on the support tubes or columns (18) and (19). The gas strut cylinder (24) is secured to collar (26) by means of the retainer (28), which as stated above is preferably joined to the collar (26) by means of a screw threaded portion (58). An important function served by the pinions (49), shaft (50) and racks (57) is to equalize the load on the two support columns (18) and (19). This ensures smooth movement of the display monitor (1), carried on beam (25) and carrier (34) (not shown in FIG. 3) up and down the columns.

A secondary but important role of the rack and pinions is to allow adjustment of the height by means of control knob or wheel (55).

Figure 4:
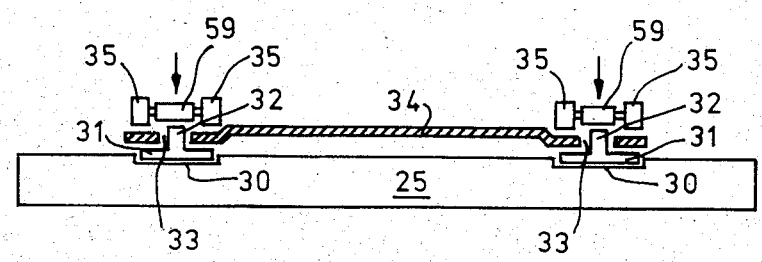
FIG. 4 is a part cross-sectional diagram illustrating the action of skid pads.
Figure 5:
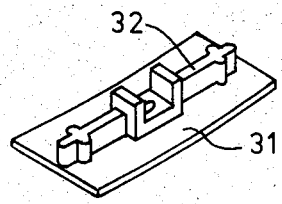
FIGS. 5 and 6 are enlarged views of a skid pad and pressure roller respectively.
Figure 6:
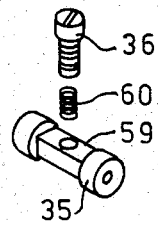

FIG. 4 is a part sectional view showing the relationship between the carrier (34) and support beam (25). Skid pads (31) are secured within recesses (30) in the surface of beam (25). Integral parts (32) of the skid pads (31) protrude through slots (33) in the carrier (34) and carry blocks (59) carrying rollers (35). (The skid pad is shown in more detail in FIG. 5.) The blocks (59) are secured to the beam (25) by means of screws (36) which pass through apertures in blocks (59) and skid pads (31). As shown in FIG. 5, a spring (60) urges the rollers (35)/block (59) against the upper surface of carrier (34), urging the lower surface of the latter against the supper surface of the skid pads (31). The friction between the skid pads (31) and the cylindrical carrier surface is adjusted by means of the screws (36). The spring (60) is contained within a counter bore in the block (59) leaving a small gap between the screwhead and the block to limit rocking of the carrier (34) with respect to the beam (25).

Figure 7:
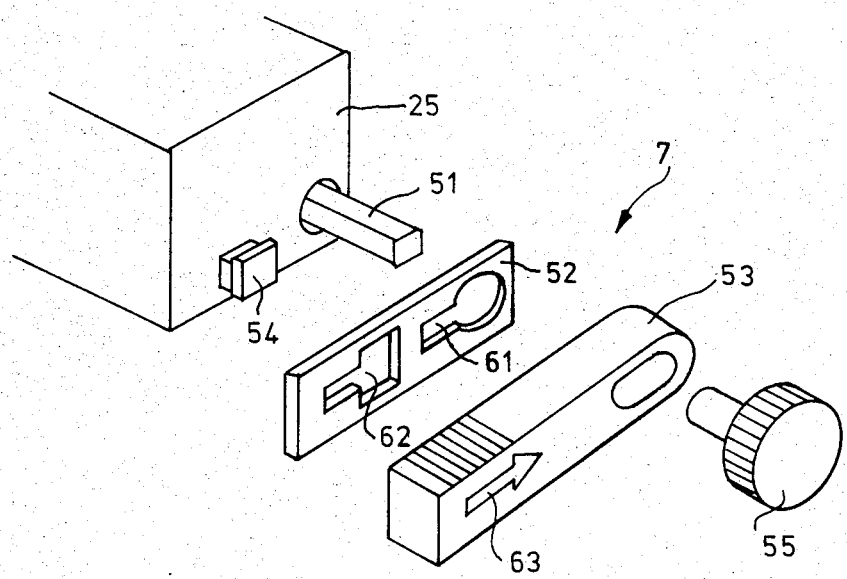
FIG. 7 is an exploded view of a latch mechanism for locking the support at an adjusted height position.

FIG. 7 shows the height adjustment lock or latch in more detail. The slidable latch plate (52) is provided with a keyhole-shaped slot (61) and a slot (62) which co-operates with guide block (54). Clearly the shaft end (51) will be locked or free to rotate depending upon the position of the key plate (52). Thus by moving the latch in the direction of the arrow (63) on cover (53), the beam (25) (and therefore the monitor) can be locked at the selected height. To release the beam (25) (and the display) the plate (52) and cover (53) are moved in the opposite direction.

Figure 8:
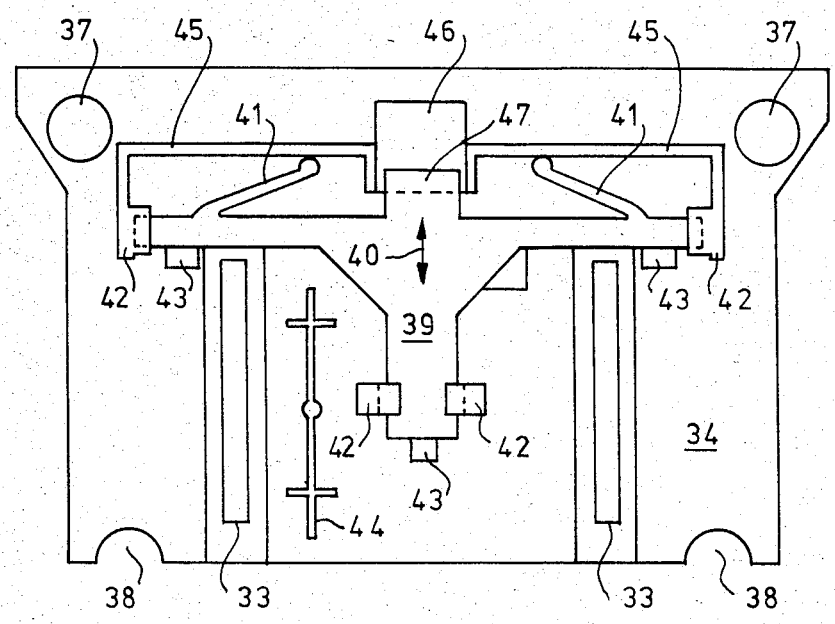
FIG. 8 is a plan view showing a carrier and a latch mechanism for securing a monitor to the carrier.

FIG. 8 is a plan view of the carrier (34) showing its relationship with the latch mechanism (39). Spring fingers (41) acting against walls (45) urge the latch (39) downwardly as viewed in FIG. 8 within the retainers (42). When a monitor is lowered onto the carrier (34) it is guided into position by the guide plate (44), apertures (37) and recesses (38) accommodating the feet of the monitor. Parts in the monitor co-operate with the camming surfaces (43) to urge the latch (39) towards the walls (45) against the spring pressure exerted by the spring fingers (41). When the monitor is fully seated on the carrier (34), the latch (39) will spring forward to secure the monitor to the carrier (34). To release the monitor from the carrier (34), the latch (39) is moved upwardly as viewed in FIG. 8 by means of release tab (47) which can be operated by a finger inserted through the aperture (46).

Figure 9:
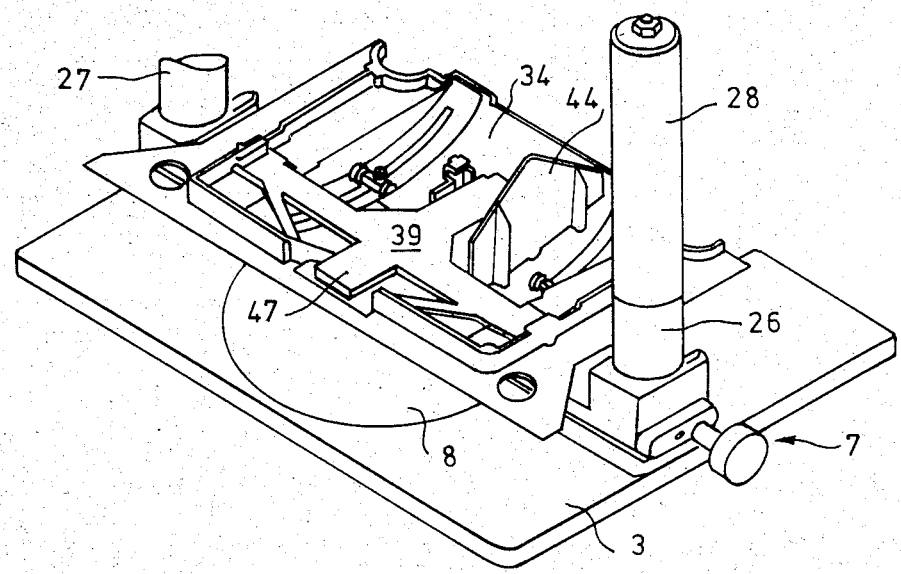
FIG. 9 shows the adjustable support with the support platform in its lowermost position.

FIG. 9 is an isometric view corresponding to FIG. 1 showing the carrier (34) in its lowermost position with the monitor removed. This is the preferred position for the monitor to be latched to the support. The main parts of the support are clearly visible.

What has been described is an adjustable support for a display monitor which allows the height and viewing angle of the display screen to be adjusted to an optimum position. The assembly can be modified for monitors of varying weights by careful choice of the gas strut and adjustment of the friction between the carrier and the skid pads. The structure is relatively simple and inexpensive: in fact if it is desired to provide only a tilt and swivel mechanism and not to provide height adjustments, the turntable (8), support beam (25), support tubes (18) and (19), and the gas strut can be replaced by a simple turntable whose upper surface is adapted to receive the skid pads (31). The carrier (34) and latch (39) can remain the same. Such a flexible construction leads to economy of manufacture.

We claim:

1. An adjustable support for a display monitor comprising a turntable, a spaced pair of vertically-extending support columns carried by said turntable, at least one of which columns is hollow to contain a gas strut of non-magnetic material, a support beam supported on said columns to extend horizontally therebetween and slidable along said columns thereby to vary the height of the support beam relative to the turntable, a support carrier mounted on said support beam between said columns in such a manner that the angle between the carrier and the beam can be varied, and means for securing a display monitor to the support carrier, the gas strut being secured by one end of the turntable and its other end to the support beam to counterbalance the weight of a display monitor secured on the carrier thereby to assist in the raising and lowering of the support beam along the support columns, in which each support column comprises a rack, a pair of pinions mounted on the support beam to co-operate with the racks being coupled together by means of a shaft to distribute the force exerted by the gas strut between the support columns.

2. A support as claimed in claim 1, in which the shaft has an extension carrying a control knob, rotation of which assists in the raising and lowering of the support beam.

3. A support as claimed in claim 1, in which a lock mechanism is provided to prevent rotation of the shaft thereby to lock the support beam to the support columns, said lock mechanism comprising a reciprocable element having a key way engageable with flats on said shaft when in one position and an aperture encircling said shaft freely when displaced reciprocably to another position.

4. A support as claimed in claim 1, in which the support carrier is provided with convex cylindrical lower bearing surfaces, tilting of the carrier with respect to the support beam being effectable by rotating and sliding of the cylindrical surfaces.

5. A support as claimed in claim 4, comprising a pair of skid pads secured to the support beam, and spring means for urging the cylindrical surface against the skid pads to frictionally engage the same.

6. A support as claimed in claim 1, further comprising a spring loaded latch mechanism secured to the carrier and operable when a display monitor is lowered into the support carrier to latch the monitor to the carrier, and means for releasing the latch mechanism to release the display monitor from the support carrier.

7. A support as claimed in claim 1, in which the support carrier is provided with a guide means for guiding the display monitor into its correct position as it is lowered into the support carrier.

8. A support as claimed in claim 1, in which the turntable is supported on a surface of low friction material secured in a circular recess of a support base by means of a nut whose torque controls the force required to rotate the turntable.

* * * * *